United States Patent [19]
Wakita et al.

[11] Patent Number: 5,123,386
[45] Date of Patent: Jun. 23, 1992

[54] INTERNAL COMBUSTION ENGINE AND ITS PISTON

[75] Inventors: Nobuaki Wakita, Nagoya; Shigeyuki Hori, Toyota; Yorishige Maeda, Toyota; Seizi Oomura, Toyota, all of Japan

[73] Assignee: Toyota Jidosha Kabushiki Kaisha, Toyota, Japan

[21] Appl. No.: 607,034

[22] Filed: Oct. 31, 1990

[30] Foreign Application Priority Data

Dec. 29, 1989 [JP] Japan ............................. 1-151097[U]

[51] Int. Cl.$^5$ ............................................. F02F 3/00
[52] U.S. Cl. ................................ 123/193.6; 92/186; 123/585
[58] Field of Search ............... 123/193 P, 585; 92/186

[56] References Cited

U.S. PATENT DOCUMENTS

| | | | |
|---|---|---|---|
| 4,428,330 | 1/1984 | Shimizu | 92/186 |
| 4,506,632 | 3/1985 | Kanda et al. | 92/186 |
| 4,530,312 | 7/1985 | Kanda et al. | 92/186 |
| 4,538,578 | 9/1985 | Suzuki et al. | 123/585 |
| 4,541,379 | 9/1985 | Ruschek et al. | 123/585 |
| 4,557,234 | 12/1985 | Ito | 123/585 |
| 4,573,441 | 3/1986 | Wietschorke et al. | 123/585 |
| 4,677,901 | 7/1987 | Ban et al. | 123/193 P |
| 4,903,658 | 2/1990 | Miyama et al. | 123/585 |
| 4,938,199 | 7/1990 | Sato et al. | 123/585 |

FOREIGN PATENT DOCUMENTS

| | | | |
|---|---|---|---|
| 3021093 | 12/1981 | Fed. Rep. of Germany | 123/193 P |
| 53-43107 | 8/1976 | Japan . | |
| 53-43108 | 8/1976 | Japan . | |
| 55-85543 | 12/1978 | Japan . | |
| 58-146059 | 10/1983 | Japan . | |
| 0045963 | 2/1987 | Japan | 123/193 P |
| 64-47959 | 3/1989 | Japan . | |

*Primary Examiner*—Andrew M. Dolinar
*Assistant Examiner*—M. Macy
*Attorney, Agent, or Firm*—Kenyon & Kenyon

[57] ABSTRACT

An internal combustion engine having its cylinders tilted at an angle of less an than 90 degrees relative to a vertical axis is provided with a oil drain mechanism for drainign excess oil that collects when the engine stops. For this purpose, an oil drain hole, which communicates with an interior of the piston body to drain the lubricating oil, is formed in the inner wall of an oil ring groove in such a way as to be located below the center line of the piston body. Both ends of the oil drain hole are set lower than the lowest portion of a piston head. Therefore, it is possible to prevent lubricating oil from entering the combustion chamber when the engine stops, without providing a whirl-stop on piston rings.

10 Claims, 3 Drawing Sheets

INTERNAL COMBUSTION ENGINE AND ITS PISTON

BACKGROUND OF THE INVENTION

1. Field of the Invention

The present invention is directed to internal combustion engines having tilted cylinders. More particularly, an improved piston oil ring drain arrangement is disclosed.

2. Description of the Related Art

Various conventional internal combustion engines have cylinders tilted at a predetermined angle relative to a vertical axis. In this type of cylinder, lubricating oil may enter the combustion chamber on the piston head side, and remain there when the engine stops. When the engine is started thereafter, the lubricating oil dwelling in the combustion chamber may be flung up in the combustion chamber by a compression ring disposed around the piston body. As a result, the lubricating oil is burned with the fuel, causing white-smoking of the exhaust gas.

A technique to prevent the lubricating oil from entering the combustion chamber is disclosed in, for example, Published Unexamined Japanese Utility Model Application Nos. 53-43107, 53-43108 and 58-146059. In this technique, a baffle or whirl-stop is applied to the piston rings, such as a compression ring and oil ring. Additionally, each ring is secured above the center line of the piston body to thereby inhibit penetration of the lubricating oil.

However, providing the whirl-stop on the piston rings hinders continuous rotation of the piston rings during reciprocation of the piston, thus preventing uniform lubrication between the piston rings and the cylinder. This is because the whirl-stop on the piston rings inhibits their mutual rotation within the ring grooves. Poor lubrication results which prevents the piston rings from moving smoothly along the cylinder. In addition, when oil sludge sticks to the piston rings, it can easily cause scuffing between the piston rings and the cylinder, producing a vertical scratch on the cylinder.

SUMMARY OF THE INVENTION

It is therefore an object of the present invention to provide an internal combustion engine having an angled piston and cylinder arrangement, which can prevent lubricating oil from entering the combustion chamber when the engine stops without providing a whirl-stop on the piston rings.

To achieve the above object in accordance with this invention, the cylinder of the internal combustion engine is tilted at an angle of less than 90 degrees relative to a vertical axis. A piston body is reciprocatively installed in the cylinder. An oil ring groove is formed in the outer wall of the piston body at an upper portion of the piston body, a top ring groove is formed about the oil ring groove in the outer wall, and a compression ring is fitted in the top ring groove. An oil drain hole formed in the piston body communicates between the interior of the piston body and the inner wall of the oil ring groove to drain lubricating oil. The oil drain hole is formed in such a way as to be positioned below the center line of the piston body, when the piston body is installed in the cylinder such that at least one end of the drain hole is set at approximately the same level as the top ring groove. In addition, both ends of the oil drain hole are set relatively lower than the lowest portion of a piston head.

BRIEF DESCRIPTION OF THE DRAWINGS

The features of the present invention that are believed to be novel are set forth with particularity in the appended claims. The invention, together with the objects and advantages thereof, may best be understood by reference to the following description of the presently preferred embodiments together with the accompanying drawings in which:

FIG. 1 is a partial cross-sectional view illustrating the relation between a cylinder and a piston;

FIG. 2 is a cross-sectional view illustrating part of an internal combustion engine;

FIG. 3 is a schematic structural diagram of a device to reduce a negative pressure generated in a combustion chamber immediately before the engine stops; and FIG. 4 is a graph illustrating a change in manifold suction pressure and engine speed at the time the engine stops.

DETAILED DESCRIPTION OF THE PREFERRED EMBODIMENT

A preferred embodiment of this invention will now be described in detail referring to the accompanying drawings.

Figure 2:
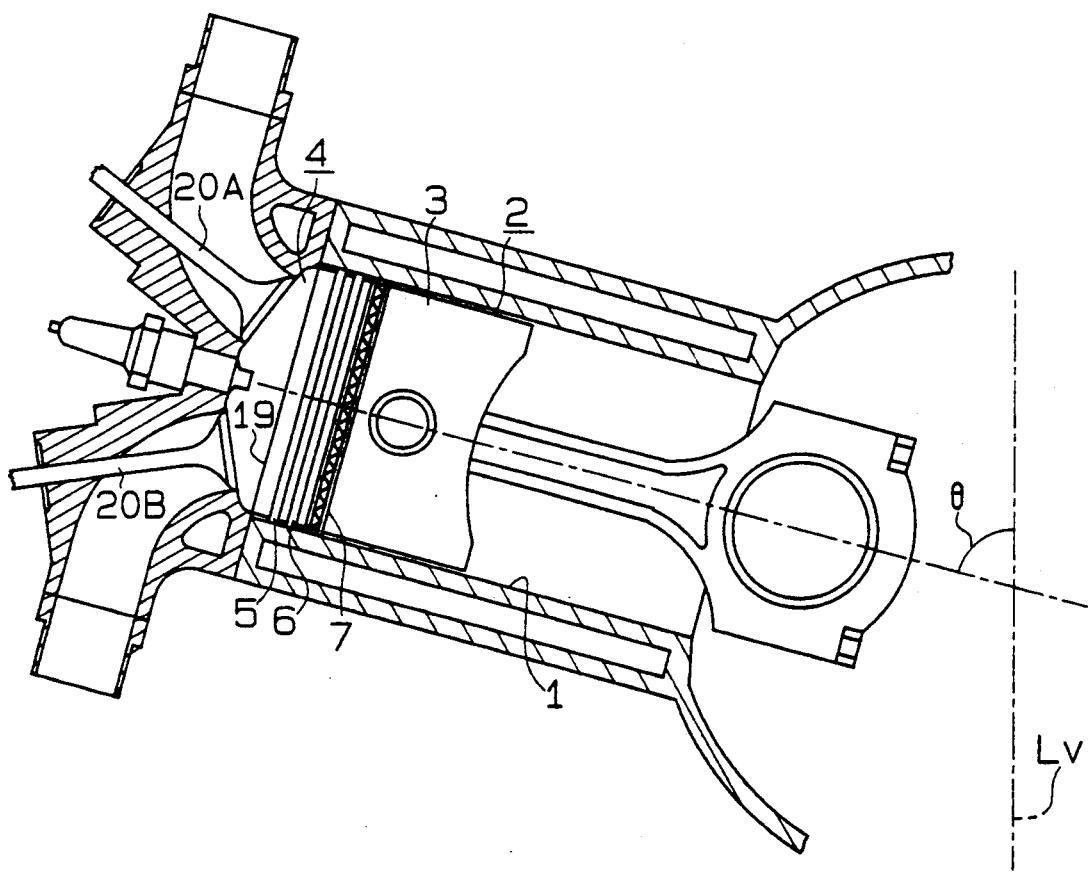

FIG. 2 is a cross section illustrating part of an internal combustion engine according to this embodiment. A cylinder 1 is tilted at an angle $\theta$ with respect to a vertical axis Lv. The angle of inclination $\theta$ is less than 90 degrees. In the described embodiment, the inclination angle $\theta$ is approximately 75 degrees.

A piston 2 includes a piston body 3 which is reciprocatively installed in the cylinder 1. Three piston rings are provided on the outer walls of the piston body 3. They include two compression rings 5 and 6 positioned close to a combustion chamber 4, and an oil ring 7 under the two compression rings.

Figure 1:
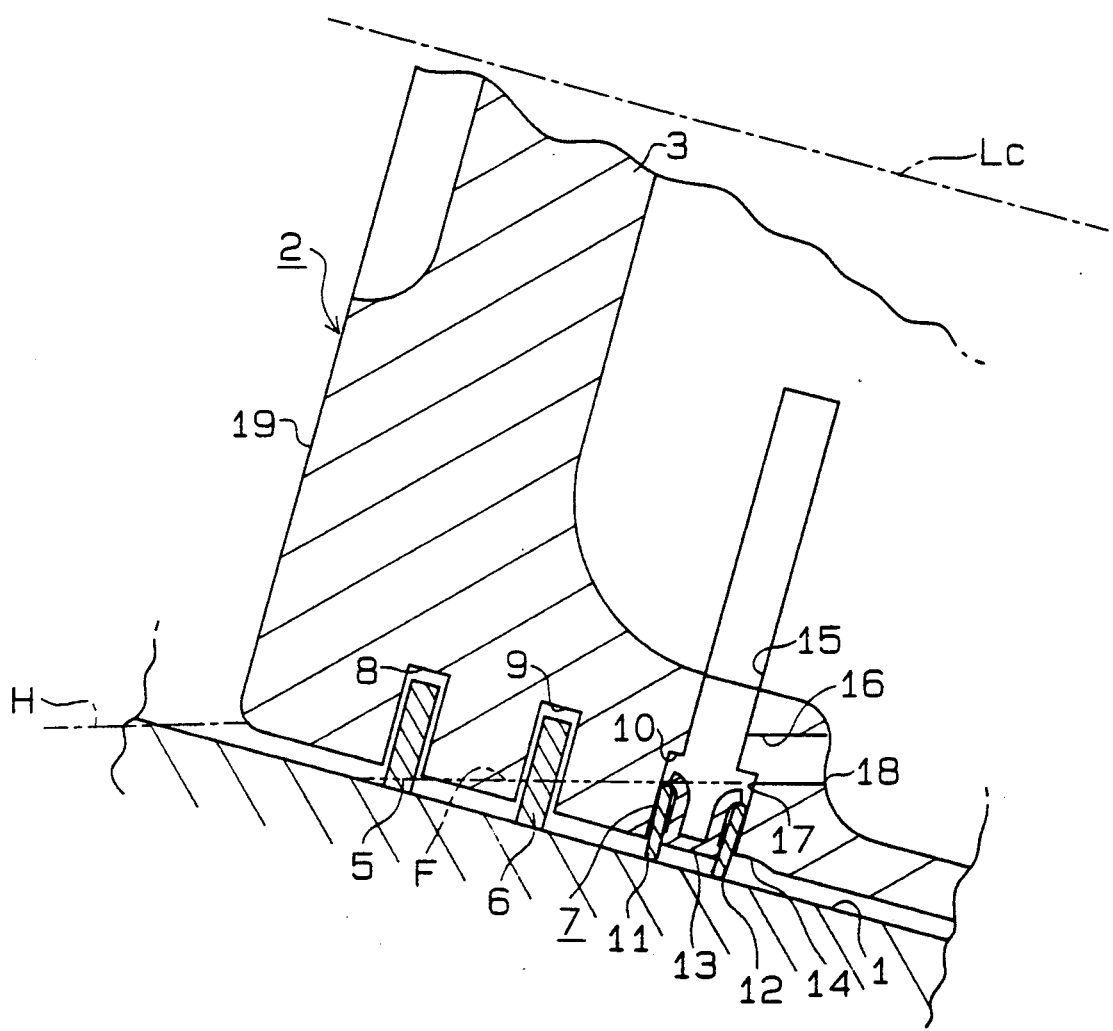
FIGS. 1 to 4 illustrate one embodiment of the present invention.

As shown in FIG. 1, the piston body 3 has a top ring groove 8, a second ring groove 9, and an oil ring groove 10 formed in parallel. The compression rings 5 and 6 are respectively fitted in ring grooves 8 and 9. As is well known, the compression rings 5 and 6 serve to provide an airtight condition to prevent mixed gas, combusting gas and/or exhaust gas in the combustion chamber 4 from leaking toward a crank case. No particular measure, such as a whirl-stop, is taken in this embodiment that prevents the compression rings 5 and 6 from rotating.

An oil ring 7 is fitted in the oil ring groove 10. The oil ring 7 comprises upper and lower side rails 11 and 12 respectively corresponding to the upper and lower inner walls of the oil ring groove 10, and an expander 13 to press the former two rails against the respective upper and lower inner walls of the oil ring groove 10 and against the cylinder 1. As well known, the oil ring 7 serves to supply the proper amount of the lubricating oil to the compression rings 5 and 6, and to drop excessive lubricating oil remaining on the cylinder 1. No particular measure, such as a whirl-stop, is taken in this embodiment that prevents the compression rings 5 and 6 from rotating.

In the outer wall of the piston body 3, an oil receiving groove 14 is formed below the oil ring groove 10 to receive dropping lubricating oil. A slit 15 is formed in the inner wall of the oil ring 10 in order to reduce thermal expansion of the piston skirt.

According to this embodiment, in addition to the slit 15, an oil drain hole 16 is bored in the inner wall of the oil ring groove 10 to communicate with the inside of the piston body 3. The oil drain hole 16 permits the lubricating oil, which tends to enter the combustion chamber 4 at the time the engine stops, to escape to the inside of the piston body 3. The hole 16 is positioned and tilted in accordance with the inclination angle $\theta$ of the cylinder 1.

In other words, the oil drain hole 16 is formed in part of the oil ring groove 10, positioned below the center line Lc of the piston body 3. An outer end 17 and an inner end 18 of the hole 16 are set relatively lower than the piston height H, that is, the height of the lowest part of the piston head 19, when the piston 2 is installed in the cylinder 1. Also, the oil hole 16 is located at the same level as the top ring groove 8.

Occasionally, the engine will stop during the compression or expansion strokes wherein the intake valve 20A and the exhaust valve 20B (as shown in FIG. 2) are both closed. In such a case, a large negative pressure is generated in the combustion chamber 4, making it easier for the lubricating oil to enter the combustion chamber 4. The internal combustion engine in this embodiment is equipped with a device to reduce the negative pressure which is generated in the combustion chamber 4 immediately before or after the engine stops.

Figure 3:
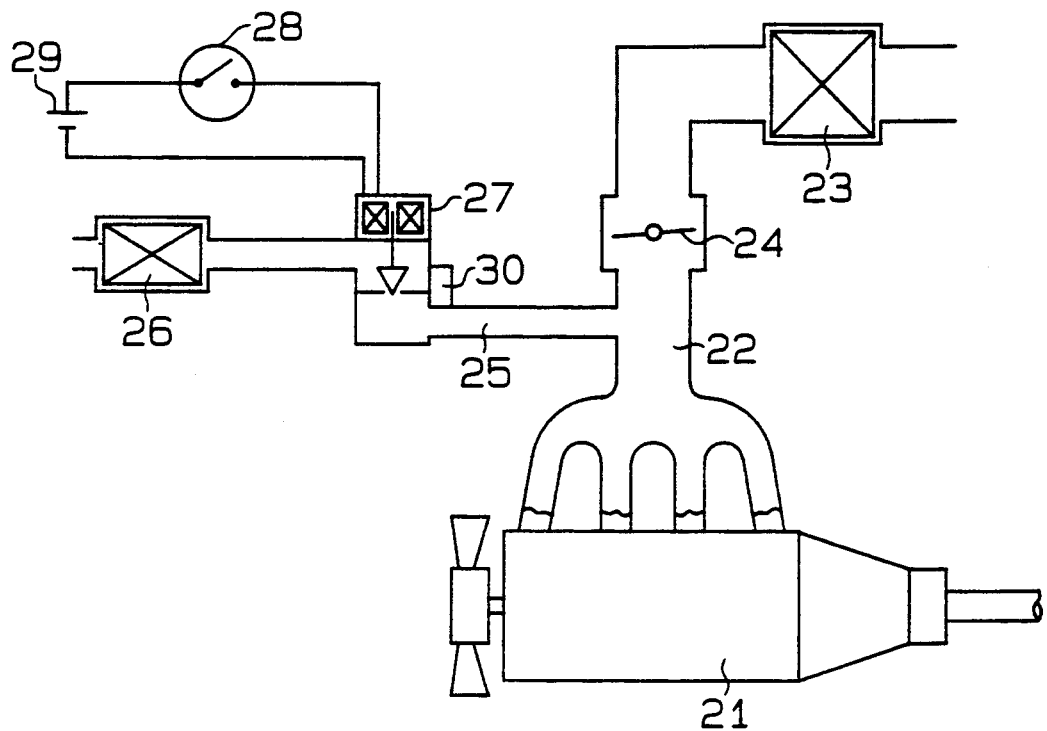

As shown in FIG. 3, a combustion engine 21, incorporating the above-described cylinder 1 and the piston 2, is connected to an intake manifold 22 communicating with the combustion chamber 4. The outside air is sucked in the intake manifold 22 through a filter 23. A throttle valve 24 is provided at a midpoint of the manifold 22. The throttle valve is opened and closed in accordance with movement of the accelerator pedal by a linkage (not shown). An auxiliary air intake 25 is connected to the intake manifold 22 downstream of the throttle valve 24. The outside air is sucked via the filter 26 into the auxiliary air intake 25. An electromagnetic valve 27 is disposed at an intermediate point in the auxiliary air intake 25 to open and close the air intake 25. The intake is open when deexcited. The electromagnetic valve 27 is electrically connected in series to an ignition switch 28 and a battery 29.

To prevent the engine speed from rapidly increasing due to an increase in the amount of sucked outside air when the engine starts with the electromagnetic valve 27 open, a valve switch 30 is provided to detect the closed status of the electromagnetic valve 27. Only when the valve switch 30 detects that the electromagnetic valve 27 is closed, can fuel be supplied to the internal combustion engine 21.

The actions of the described internal combustion engine will now be explained.

When the ignition switch 28 is turned off to stop the engine, the electromagnetic valve 27 is open, and outside air is introduced through the auxiliary air intake 25 to the intake manifold 22. Even when the accelerator pedal is released (thereby closing the throttle valve 24), the suction pressure in the intake manifold 22 will drop when the electromagnetic valve 27 is open.

Figure 4:
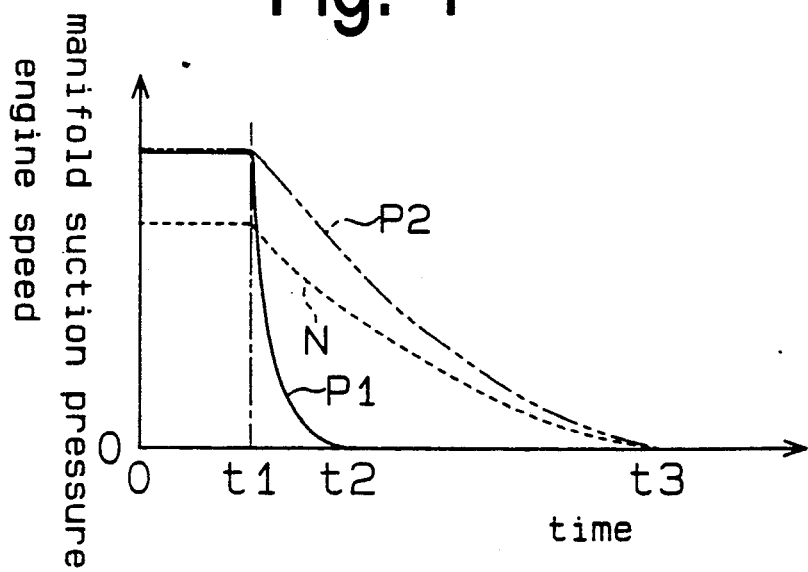

FIG. 4 illustrates this process. When the ignition switch 28 is shut off at time t1, the engine speed N gradually decreases until time t3 at which the engine completely stops, as indicated by the broken line. On the other hand, the manifold suction pressure P1 sharply drops until time t2, shortly after the ignition switch 28 is turned off, as illustrated by the solid line. Since the conventional internal combustion engine is not equipped with a specific mechanism, such as an auxiliary air intake and electromagnetic valve, the manifold suction pressure P2 in such an engine gradually decreases until time t3 with a change in engine speed, as shown by the two-dot chain line. This means that the conventional manifold suction pressure P2 decreases much more slowly than the manifold suction pressure P1 in the present embodiment.

As described above, with the engine stopping, the manifold suction pressure P1 rapidly decreases in the internal combustion engine of the present embodiment. Accordingly, the negative pressure generated in the combustion chamber 4 can be reduced before the engine completely stops. No matter when the engine stops during the compression or expansion in which the intake valve 20A and the exhaust valve 20B are both closed, the negative pressure generated in the combustion chamber 4 is significantly smaller thus preventing the lubricating oil from entering the combustion chamber 4.

According to this embodiment, the cylinder 1 is tilted at an inclination angle $\theta$ of 75 degrees with respect to the vertical axis Lv. This causes the lubricating oil to be temporarily received in the oil ring groove 10 and oil receiving groove 14 over their entire lengths when the engine stops. The lubricating oil tends to flow down to the lower portions of the grooves 10 and 14, i.e., the lower part of the piston body 3 which is located below the center line Lc. At this time, the lubricating oil on the interior of the piston body 3 also tends to flow out via the slit 15 to the lower part of the piston body 3. The amount of the lubricating oil that would normally collect at the lower part of the oil ring groove 10, varies depending on the operational conditions immediately before the engine stops, and also changes according to the level of the negative pressure generated in the combustion chamber 4.

In the present embodiment, however, the oil drain hole 16 is provided on the inner wall of the oil ring groove 10, so that the lubricating oil collected at the lower part of the piston body 3 escapes through the oil drain hole 16. The outer end 17 and the inner end 18 of the oil drain hole 16 are set relatively lower than the piston height H, which indicates the height of the lowest part of the piston head 19. The surface F of the lubricating oil which has not escaped through the oil drain hole 16, is kept below the piston height H of the piston head 19.

As a result, even when the individual rings 5 to 7 rotate and their engaging lips come to where the lubricating oil collects, i.e., even in a state where penetration of the lubricating oil into the combustion chamber 4 is easiest, the lubricating oil which has not been drained away through the hole 16 would not flow into the combustion chamber 4. As the negative pressure generated in the combustion chamber 4 can be reduced to a considerably lower level than conventional engines in the embodiment described above, it is possible to more effectively prevent the lubricating oil from entering the combustion chamber 4, due to the reduction of the negative pressure.

When the engine starts, therefore, the collected lubricating oil is seldom flung by the compression rings 5 and 6. Consequently, the lubricating oil does not burn with the fuel, thereby preventing white-smoking of the exhaust gas. This can also suppress the lubricating oil consumption.

According to this embodiment, both compression rings 5 and 6, and the oil ring 7 are not provided with any specific measure to inhibit their rotation. This facilitates the installation of the rings 5 to 7 onto the piston body 3 as well as the manufacturing of the rings. Further, during the reciprocation of the piston 2, the rings 5 to 7 continually rotate to ensure uniform lubrication between the rings and the cylinder 1. This allows the lubricating oil to be effectively applied to the piston, and prevents scuffing from occurring in the cylinder 1.

Although, in the above-described embodiment, the inclination angle $\theta$ of the cylinder 1 is set to 75 degrees, it can be set to any value within 90 degrees except when the cylinder is disposed vertically ($\theta = 0$ degree) or horizontally ($\theta = 90$ degrees).

The outer end 17 and inner end 18 of the oil drain hole 16 in the aforementioned embodiment are set approximately at the same level as the top ring groove 8. As long as both ends of the oil drain hole are lower than the piston head, however, it does not matter if the ends are located higher or lower than the top ring groove. Additionally, both ends of the oil drain hole may be located at different heights as long as each end is lower than the piston head.

In this embodiment, in order to suppress the negative pressure generated in the combustion chamber 4 immediately before stopping the engine, the outside air is directly sucked from one end of the auxiliary air intake 25 through the filter 26. Alternatively, one end of the auxiliary air intake 25 may be connected to the intake manifold upstream of the intake valve, bypassing the outside air which is introduced into the intake manifold.

In addition, although a device comprising the auxiliary air intake 25 and the electromagnetic valve 27 are provided in the above-described embodiment to reduce the negative pressure generated in the combustion chamber 4 immediately before stopping the engine, this device is optional.

While the present invention has been described in connection with what is presently considered to be the most practical and preferred embodiment, it is to be understood that the invention is not limited to the disclosed embodiment, but is intended to cover various modifications and equivalent arrangements included within the scope of the appended claims.

What is claimed is:

1. In a piston for use in an internal combustion engine including a piston body reciprocatively installed in a cylinder tilted with respect to a vertical axis at an angle of less than 90 degrees, an oil ring groove formed in an outer wall of the piston body at an upper portion of the piston body, a top ring groove formed above the oil ring groove in the outer wall of the piston body, and a compression ring fitted in the top ring groove, the improvement comprising:

an oil drain hole formed in an inner wall of the oil ring groove for communicating with an interior of the piston body to drain lubricating oil, the oil drain hole being positioned below a center line of the piston body such that at least one end of the drain hole is set at approximately the same level as the top ring groove; and wherein both ends of the oil drain hole are set relatively lower than the lowest portion of a piston head.

2. A piston according to claim 1, wherein the cylinder is tilted at an inclination angle of approximately 75 degrees with respect to the vertical axis.

3. A piston according to claim 1, wherein the piston body includes a piston skirt and a slit for reducing thermal expansion of the piston skirt.

4. A piston according to claim 1, wherein an oil receiving groove is formed in the outer wall of the piston body below the oil ring groove.

5. A piston according to claim 1, wherein an oil ring is fitted in the oil ring groove.

6. A piston according to claim 5, wherein the oil ring is permitted to rotate around the piston body.

7. A piston according to claim 1, wherein a second ring groove is formed between the top ring groove and the oil ring groove in the outer wall of the piston body, and a second compression ring is fitted in the second ring groove.

8. A piston according to claim 7, wherein the compression rings are each permitted to rotate around the piston body.

9. An internal combustion engine comprising:
an intake manifold
a cylinder tilted relative to a vertical axis at an angle of less than 90 degrees;
a piston body reciprocatively installed in the cylinder;
a combustion chamber communicating with the cylinder;
an oil ring groove formed in an outer wall of the piston body;
a top ring groove formed above the oil ring groove in the outer wall of the piston body:
a compression ring fitted in the top ring groove,
an oil drain hole formed in an inner wall of the oil ring groove for communicating with an interior of the piston body to drain lubricating oil, the oil drain hole being positioned below a center line of the piston body such that at least one end of the drain hole is set at approximately the same level as the top ring groove, and both ends of the oil drain hole are set relatively lower than the lowest portion of the piston head;
a throttle valve provided in the intake manifold for selectively introducing outside air to the combustion chamber;
an auxiliary air intake, provided downstream of the intake manifold throttle valve, for supplementing the suction of outside air; and
a supplemental-suction control valve provided in the auxiliary air intake, the supplemental-suction control valve being arranged to open when the engine stops and close when the engine is in operation.

10. An internal combustion engine according to claim 9, wherein the supplemental-suction control valve is an electromagnetic valve which is actuated by operation of an ignition switch.

* * * * *